United States Patent [19]

Hudson

[11] Patent Number: 5,984,994
[45] Date of Patent: Nov. 16, 1999

[54] SULFUR COATED FERTILIZERS WITH IMPROVED ABRASION RESISTANCE

[76] Inventor: Alice P. Hudson, 328 W. 11th St., Riviera Beach, Fla. 33404

[21] Appl. No.: 09/008,449

[22] Filed: Jan. 16, 1998

[51] Int. Cl.[6] .............................. C05C 9/00; A01N 25/00; B05D 7/00
[52] U.S. Cl. ............................ 71/28; 71/64.02; 71/64.07; 71/64.12; 71/64.11; 71/64.13; 427/212; 427/213
[58] Field of Search ..................... 71/64.11, 28, 64.07, 71/64.13, 64.02, 64.12; 427/213, 212

[56] References Cited

U.S. PATENT DOCUMENTS

| | | | |
|---|---|---|---|
| 5,137,563 | 8/1992 | Valkanas | 71/64.07 |
| 5,176,734 | 1/1993 | Fujita et al. | 71/11 |
| 5,225,278 | 7/1993 | Kielbania, Jr. et al. | 428/402.22 |
| 5,300,135 | 4/1994 | Hudson et al. | 71/28 |
| 5,599,374 | 2/1997 | Detrick | 71/28 |
| 5,603,745 | 2/1997 | Pettersen et al. | 71/58 |

FOREIGN PATENT DOCUMENTS 149449  6/1977  Japan .

*Primary Examiner*—Gary P. Straub
*Assistant Examiner*—Melanie C. Wong

[57] ABSTRACT

Sealant compositions for sulfur coated fertilizer particles are mixtures of wax materials and additives which provide improved moisture barrier properties and abrasion resistance. The sealants have penetration values measured by ASTM D-1321 of at least 20 at 25° C., and congealing points measured by ASTM D-938 of between about 50° C. and about 100° C. The sealed fertilizer particles are conditioned with particulate materials with a surface area of at least about 2 m²/g and an oil absorption of at least about 100%. A method for the production of abrasion resistant sulfur coated fertilizers is also disclosed.

14 Claims, No Drawings

SULFUR COATED FERTILIZERS WITH IMPROVED ABRASION RESISTANCE

BACKGROUND OF THE INVENTION

1. Field of the invention

Fertilizer granules or prills which have been coated with sulfur to slow the rate of dissolution of the nutrients in the soil when they are applied as a fertilizer can be coated with a sealant to improve the slow release properties of the particles. This invention relates to sealant compositions with improved slow release properties and abrasion resistance. Small particle inorganic materials are added as conditioners to provide acceptable flow properties.

2. Description of the prior art

The process for sulfur coating of urea granules or prills was developed in 1968 by the Tennessee Valley Authority (TVA) in Muscle Shoals, Alabama, as an economical system for reducing the rate of dissolution of urea particles when they are applied to the soil as fertilizer. U.S. Pat. No. 3,342,577 describes this sulfur coating process and also the sealant material that was necessary to fill in the holes that result naturally in the sulfur coating as it cools. The TVA process is also described in Sulphur Inst. J. 4(3) 2–6 (1968), ibid. 8(4) 2–5 (1972a) and ibid. 8(4) 6–8 (1972b). The TVA recommendation for the sealant is a mixture of 30% polyethylene resin in 70% bright stock mineral oil. A conditioning agent is applied over the sealant to provide free flowing particles.

U.S. Pat. No. 4,042,366 describes a modification of this process in which particles of water soluble nutrients are embedded in a soft petroleum wax coating to provide anticaking properties to the coated particles as well as nutrient benefits.

The process is further described in Sulfur Coating of Urea Treated with Attapulgite Clay, Gullett, G. L.; Simmons, C. L.; and Lee, R. G.: presented at the 198th American Chemical Society meeting in Miami Beach, Fla., in September 1989.

The requirement for a sealant for sulfur coated urea (SCU) has been documented by McClellan and Scheib (Sulphur inst. J. 9(3/4) 8–12 (1973)), and by Scheib and McClellan ibid. 12(1) 2–5 (1976).

A description of slow release urea and NPK fertilizers is given in Hort. Rev. 1 79–140 (1979).

A number of products have been developed recently for the purpose of providing sealed SCU compositions that have improved slow release properties and also do not require the use of a conditioner. U.S. Pat. No. 5,300,135 describes the use of mixtures of polymers and hard waxes as sealants for SCU. SCU sealed with these compositions are free flowing particles which do not need a conditioner. The addition of the polymer provides improved abrasion resistance over SCU sealed with the wax alone. U.S. Pat. No. 5,423,897 describes surfactant modified hard waxes used as sealants for SCU. The surfactants provide anti-blocking properties in the waxes, and the coated SCU does not require a conditioner. U.S. Pat. No. 5,478,375 describes sealants for SCU which are mixtures of fatty esters of polyhydric alcohols and polymers, crosslinked with a transesterification catalyst. These compositions do not require a conditioner. U.S. Pat. No. 5,599,374 describes a urethane polymer coating for SCU which produces free flowing particles with improved impact resistance.

The use of hard non-blocking sealants, while it improves the slow release properties and eliminates the need to apply conditioners, does not provide adequate impact resistance. Product produced by these methods must be transported, blended and applied by methods that avoid high impact or vigorous abrasion, or a significant portion of the slow release properties may be lost. Urea and blended fertilizers, when they are mixed and bagged, must be labeled with their water insoluble nitrogen (WIN) content, which is a measure of the nitrogen which is not immediately soluble in water, and it is the responsibility of the manufacturer to assure that the value does not decrease below the labeled value during shipping and storage. Thus a significant loss in WIN resulting from handling in modem high-speed equipment can create a situation in which the fertilizer is mislabeled and subject to recall.

OBJECTS

It is an object of this invention to provide sealants and conditioners for SCU which will act to give the SCU granules or prills high water insoluble nitrogen (WIN) values and provide urea prills or granules which will release the urea to the soil at a slow uniform rate over an extended period of time.

It is a further object of this invention to provide a sealant for SCU which can be readily applied to the SCU particles in a molten form.

Another object of this invention is to provide sealants and conditioners for SCU which provides high WIN values which are not significantly decreased by impact and abrasion encountered in shipping, mixing, bagging, and storage.

A further object of this invention is to provide sealants and conditioners for SCU which produce free flowing particles.

Other objects and further scope of applicability of the present invention will become apparent from the detailed descriptions given herein; it should be understood, however, that the detailed descriptions, while indicating preferred embodiments of the invention, are given by way of illustration only, since various changes and modifications within the spirit and scope of the invention will become apparent from such descriptions.

SUMMARY OF THE INVENTION

It has now been discovered that the decrease in WIN values of SCU on abrasion or impact when hard waxes are used as sealants occurs largely because the rigid sealants, though they may form cohesive slowly water permeable films which adhere strongly to the sulfur surface, fail to protect and prevent damage to the brittle sulfur coating underneath the sealant when the particles are subjected to impact and abrasion encountered in transporting, blending and applying the fertilizer particles. This results in cracks in the sulfur and fracture of the urea-sulfur bond and consequent loss of slow release properties. The improved slow release properties and abrasion resistance imparted to the SCU particles by the practice of this invention are achieved by the provision of sealant compositions which are soft and deform to prevent mechanical shock to the sulfur coating on abrasion or impact. The bases for these sealants are waxes and wax-like materials which produce compositions having congealing points measured by the method of ASTM D-938 between about 50 and about 100° C. and needle penetration values measured by the method of ASTM D-1321 of greater than about 20 at 25° C. The moisture barrier properties and the abrasion resistance of the soft wax materials used are improved by the addition of materials which enhance the adhesion between the sealant and the sulfur and provide plasticity to the compositions, and thus the slow release properties of the sealed SCU fertilizer are improved at all stages of its manufacture, handling, and use. The sealed fertilizer particles are conditioned by the addition of small particle inorganic materials which have a surface area of at least about 2 m$^2$/g measured by the BET nitrogen absorption method, and oil absorption values of at least about 100 g/100 g measured by dibutyl phthalate (DBP) absorption, in an amount sufficient to render the sealed SCU particles free flowing.

This invention also encompasses a method for making slow release abrasion resistant free flowing SCU compositions which comprises the steps of applying a molten sealant containing an additive herein described to the SCU granules and allowing the sealant to spread over the surfaces of the particles;

cooling the coated granules so as to solidify the sealant without agglomerating the particles; and adding to the cooled particles a high surface area particulate material as a conditioner, with mixing adequate to distribute the conditioner over the sealed particles.

DESCRIPTION OF THE PREFERRED EMBODIMENT

The soft sealant materials useful in this invention are mixtures of waxes and wax-like materials and additives to enhance the slow release properties and the abrasion resistance of the sealant formulations. The resulting compositions have congealing points measured by the method of ASTM D-938 between about 50° C. and 100° C. and preferably between about 60° C. and 85° C., and needle penetration values, measured by the method of ASTM D-1321, of at least about 20 at 25° C.

ASTM D-938 is performed as follows: A sample of wax is melted and a droplet is made to adhere to the bulb of a thermometer. Using a prewarmed flask as an air jacket, the droplet on the bulb is allowed to cool at a fixed rate until it congeals. The congealing point is observed as the temperature at which the droplet ceases to flow as the thermometer is rotated.

ASTM D-1321 is performed as follows: The sample is melted, heated to 17° C. above its congealing point, poured into a container, and then air cooled under controlled conditions. The sample then is conditioned at the test temperature in a water bath.

Penetration is measured with a penetrometer, which applies a standard needle to the sample for 5 seconds under a load of 100 g. Values are reported in units of decimillimeters.

The waxes and wax-like materials can be based on petroleum waxes, including petrolatums, slack waxes, paraffins, microcrystalline waxes, or mixtures of these; synthetic waxes such as polyolefins; natural waxes or oils or mixtures of these, mixtures of oils and waxes; or mixtures of oils and polymers.

Suitable materials include petroleum based waxes such as slack waxes and petrolatums which have congealing points between about 50 and 100° C., and oil contents, measured by the method of ASTM D-721, of about 3 to about 30%. These can be mixed with harder petroleum based waxes such as paraffin waxes or microcrystalline waxes which usually contain less than about 1% oil, provided that the level of the harder waxes present is such that the needle penetration value of the final sealant mixture is greater than about 20. A very large number of these waxes are manufactured by petroleum refineries and are sold by the refineries and by wax distributors under many trade names. The waxes are typically characterized by type, melting point, congealing point, cone or needle penetration values, oil content, specific gravity, melt viscosity, and color. Those skilled in the art will recognize that a very large number of waxes and combinations of waxes will fall within the congealing point and hardness values required in this invention.

Synthetic waxes such as polyethylenes are also suitable. A soft polyethylene, AC-1702 from Allied Signal, Inc., Morristown, N.J. has a needle penetration value of about 60 to 90, and is a suitable wax by itself. Polyethylene waxes usually have needle penetration values below 20 and thus for utility in this invention must be mixed with softer waxes or other soft or liquid materials. Materials which are too hard by themselves but are suitable in mixtures with softer materials include C30+ alpha olefin, which is available as Gulftene 30+ from Chevron Chemicals. Houston, Tex. This is a synthetic wax made by the polymerization of ethylene, and has a typical composition of about 3 to 30 weight % $C_{24-28}$ hydrocarbons, about 60 to 95 weight % $C_{30-56}$ hydrocarbons and 0 to about 20 weight % $C_{58}$ and higher hydrocarbons. It consists of about 0.5 to 2 weight % paraffins (with no unsaturation), about 30 to 40 weight % hydrocarbons with vinylidiene double bonds and about 50 to 55 weight % hydrocarbons with alpha double bonds. The congealing point is about 70° C. Another suitable composition is a mixture of polyethylene and a heavy paraffinic oil, in a ratio such that the congealing point is between about 60 and 100° C. and the needle penetration value is between about 50 and 120.

Natural animal, vegetable, and mineral waxes may also be used. Those which are adequately soft, for example, beeswax, may be used as the sole wax material. Most of these natural waxes, however, are too hard and must be modified or blended with softer waxes or with other soft or liquid materials. Examples of suitable wax materials include mixtures of hard natural waxes such as are montan wax, carnauba wax, candelilla wax, and rice bran wax, with slack waxes or petrolatums with oil contents of at least about 10%.

Fats and oils which are triacyl esters of glycerine, preferably derived from natural sources, said acyls containing from about 14 to about 22 carbon atoms, may also be suitable. To obtain those products with congealing points above about 50° C. and needle penetration values above about 20, the natural fats and oils are preferably modified by partial hydrogenation to produce iodine values of about 20 to about 80. Mixtures of these products are also suitable. Suitable sources include lard oil, beef tallow, mutton tallow, cod liver oil, herring oil, menhaden oil, corn oil, palm oil, peanut oil, rapeseed oil, soybean oil, canola oil, and sunflower seed oil.

Mixtures of the above described wax materials are also useful.

The additives useful in this invention are materials that are soluble in the molten waxes and do not separate from the mixtures on cooling, and that improve the moisture barrier properties and abrasion resistance compared to the wax materials by themselves. The additives are chosen to provide improved adhesion between the waxes and the sulfur substrate, and to provide enhanced plasticity to the wax materials, resulting in the improved performance of the sealants. In general the additives are materials with hydrocarbon portions and polar moieties, in a balance to provide adequate wax solubility from the hydrocarbon portion, and sufficient polar moieties to interact with the sulfur to improve the adhesion of the sealants to the sulfur. Preferred polar moieties include esters, carboxylic acid and chlorine. Effective additives may also disrupt crystal growth in the waxes, or add a liquid component, resulting in improved plasticity in the mixtures.

The mixtures of wax materials and additives must have congealing points between about 50 and about 100° C., and needle penetration values above about 20. Additives which have been found to provide improved adhesion and moisture barrier properties include:

1. Wax soluble polymers which contain both polar and nonpolar monomers. Wax soluble copolymers of ethylene with vinyl acetate, acrylic acid, ethyl acrylate or mixtures of these are suitable. Materials with melt indexes of at least about 20 are preferred. Copolymers or terpolymers containing acrylic acid with Acid Numbers from about 5 to about 120 are also preferred. Available products found to be particularly effective include Elvax 4310, which is an ethylene-vinyl-acetate-acrylic acid terpolymer with a melt index of about 500, a vinyl acetate content of about 25% by weight, and an Acid Number of 4–8, available from DuPont, Wilmington, Del. Another effective polymer is AC-5120 which is a copolymer of ethylene and acrylic acid with an Acid Number of about 120 and a Brookfield viscosity of 650 cps at 140° C., available from Allied Signal, Inc., Morristown, N.J. These polymers are effective when added to the wax materials at levels from about 2% to about 20%. Preferred sealants contain Elvax 4310 at levels from about 3% to about 10%.

2. Chlorinated paraffins containing from about 20 to about 50% chlorine by weight. These products are particularly useful because they have excellent moisture barrier properties, and they are liquid materials which can be used to increase the needle penetration values of the compositions. These products are widely available and are manufactured by bubbling chlorine into paraffin until the desired chlorine content is reached. They are soluble in the wax materials of this invention at chlorine contents of up to about 50% by weight. They can be added to the wax materials at levels from about 3% to about 25%.

3. Rosin esters, particularly those with free acid functionality. These products provide improved adhesion to the sulfur, and also provide increased plasticity to the wax materials. Esters effective in this application include Sylvatac 40N which is a rosin ester of pentaerythritol with an acid value of about 9 and a ring and ball softening point of about 81° C., available from Arizona Chemical, Panama City, Fla., and Sylvatac 100NS, which is also a rosin ester of pentaerythritol with an acid value of about 11 and a ring and ball softening point of about 100° C. The rosin esters are effective when they are added to the wax materials at levels from about 3% to about 10%.

4. Tall oil pitch, which is a by-product residue from tall oil production, and contains an undetermined mixture of rosin acids, esters, and hydrocarbons, is also useful in compositions where it has adequate solubility. In general it is soluble in compositions based on fats and oils and not soluble in hydrocarbon waxes. Because its exact composition is variable, its performance in this application may also vary. Also it is extremely dark in color, which may be undesirable for some end uses. It is effective in promoting adhesion and improving moisture barrier properties when it is added to the compositions at up to about 10%.

The sealant materials containing additives are added to the SCU at levels from about 1% to about 4% by weight of the total compositions, depending on the size of the SCU granules, and the slow release properties desired. For SCU with a particle size of about 2 to 2.5 microns in diameter, which is commonly produced, sealant is preferably added at about 1.5 to 2.5%.

The particulate materials useful as conditioning agents in this invention are chosen from water insoluble small particle inorganic materials which have surface areas of greater than about 2 $m^2/g$ measured by the method of BET nitrogen absorption, and oil absorption, measured as DBT, of greater than about 100% by weight. They preferably contain less than 1% crystalline silica. Conditioning agents found to be useful in the compositions of this invention include:

1. Diatomaceous earth, which is prepared from diatomite, a chalky, sedimentary rock composed of the skeletal remains of prehistoric diatoms. It is processed to a number of products varying in particle size, purity, and crystallinity. Those useful in this application typically have BET surface areas of about 10 to about 40 $m^2/g$, DBT absorption of about 120 to 200% by weight, and crystalline silica content of less than about 1%. They are standard products well known in the art, and are available from many sources.

2. Amorphous calcium silicate, which can be prepared from diatomite by hydrothermal reaction with lime and water, or can be precipitated. An effective product at low levels is MicroCel E, which has a surface area of about 120 $m^2/g$ and an oil absorption of about 480%, and is available from Celite Corporation, Lompoc, Calif.

3. Synthetic precipitate silicas. These products typically have surface areas varying from about 150 to about 500 $m^2/g$ and oil absorption values up to about 500%. They are effective at low levels. They are available from many sources. Products found effective in this application include Sipernat 50 which has a surface area of about 450 $m^2/g$ and an oil absorption of about 340% by weight, and is sold by Degussa in Frankfort, Del.

4. Clay minerals, including selected grades of kaolin, attapulgite, bentonite, sepiolite, montmorillonite and talc. These are available from many sources, and have properties that vary widely depending on their type, source, and manufacturing process. Products which have useful properties in this application include calcined kaolins which have greater surface areas than untreated products and typically have oil absorption values of about 100%. Attapulgites typically have surface areas of about 100 to 150 $m^2/g$, and oil absorption of about 100 to 115% and are also suitable.

5. Perlite, which is an expanded quartz mineral. It is usually characterized by particle size determined by sieve analysis, and by bulk density. It is highly effective in this application, because it is an efficient conditioner and does not interfere with moisture barrier properties, but it tends to leave the conditioned particles hydrophobic, which is undesirable for most fertilizer applications, and thus it is less preferred.

The conditioners are used at levels from about 0.2% to about 3% by weight of the total composition. Materials with oil absorption values of greater than about 300% are usually more efficient than products with lower oil absorption, and can be used at levels as low as 0.2%, with levels from about 0.4% to 0.8% being preferred. If more than this level is added it can interfere with the moisture barrier properties of the sealant, and also the conditioned product becomes very dusty.

Diatomaceous earths are used at levels of from about 1% to about 3%, with levels from about 1% to about 2% being preferred.

Another aspect of this invention is a method for producing free flowing SCU granules with enhanced slow release properties which are not substantially decreased on abrasion.

The method comprises the steps of:

1. Applying the molten sealant to the SCU urea granules and allowing the sealant to spread over the surfaces of the particles. The sealant is customarily applied to the warm SCU granules in a coating drum, as soon as possible after they exit from the sulfur coating operation. The granules must be at a temperature at least equal to the congealing point of the sealant, and are preferably at a temperature about 5 to 20° C. above this temperature to allow the sealant to flow and completely cover the granules. Excessive heating is undesirable because it requires more cooling of the product in the subsequent step.
2. Cooling the coated granules so as to solidify the sealant without agglomerating the sealed fertilizer particles. Cooling the product in a fluid bed with air at a temperature at least about 10 to 20° C. below the congealing point of the wax is effective. Other methods such as cooling with an air flow in a drum, or on a vibrating conveyer may be used. The sealed SCU must be cooled in this step to below the congealing point of the wax, and is preferably cooled to below about 40° C., to allow the sealant to completely solidify, which tends to minimize the amount of conditioner necessary to add to achieve free flowing particles, and also keeps the conditioner on the surface of the particles to the greatest extent possible, to prevent its interference with the moisture barrier properties of the sealant.
3. Applying a particulate material as a conditioner to the cooled particles with mixing adequate to distribute the conditioner over the sealed particles. This step can be carried out by adding the conditioner to a rolling bed of the sealed particles in a drum. It is preferably accomplished with a minimum of mixing, only adequate to distribute the conditioner uniformly over the sealed particles. Minimum mixing minimizes the extent to which the conditioner is embedded in the wax, which can cause a deterioration of the slow release properties.

In the following examples, all percentages are by weight of the total composition.

EXAMPLE 1

A sealant composition was prepared by heating 95 g of a petrolatum with a congealing point of 66–70° C., an oil content 22%, and needle penetration value of 110, herein designated Wax A, to 120° C. and adding 5 g of Elvax 4310 with good stilling. After about 10 minutes the polymer had completely dispersed in the wax, and the mixture was a transparent low viscosity liquid. The congealing point, measured by the method of ASTM 938 was 70° C. and the needle penetration measured by the method of ASTM 1321 was 72.

The amounts of this sealant indicated in Table 1 were applied to SCU granules with a 13% by weight coating of sulfur and an average particle size of about 2 to 2.5 mm diameter, and the sealed particles were conditioned with diatomaceous earth (DiaFil 610 from CR Minerals Corporation, Golden, Colo.) at the levels indicated, by the following procedure. 200 g of SCU were heated to 70–75° C. in a pan heated with a sand bath, and the appropriate amount of molten sealant was added. The mixture was stirred for about 2 minutes to evenly coat the particles with the wax. The coated particles were cooled in an air stream with gentle stirring until the temperature had dropped to below 40° C. At this point the amounts of conditioner indicated in Table 1 were added slowly with stirring. The mixture was swirled gently until the conditioner was evenly distributed over the particles.

The slow release properties of the coated particles was determined by a modification of the method proposed by the TVA. 200.0 g of distilled water and 40.0 g of the product to be tested were placed in a 10 ounce glass bottle and covered tightly. The bottle was gently swirled to wet all of the particles, placed in an oven at 38° C., and allowed to stand undisturbed for 7 days. After 7 days the bottle was swirled to completely mix the contents, a sample of the water phase was removed and filtered, and the refractive index was determined. The amount of urea present in the water phase was calculated from the refractive index using a standard curve of refractive index vs. urea concentration. This was compared to the amount originally present in the particles to determine the % released.

To determine the abrasion or impact resistance, approximately 41 g of the coated urea was dropped 5 times through a 6 ft long, 4 in diameter PVC pipe to a stainless steel surface. The release rate of the abraded material was determined by the procedure described above.

TABLE 1

| % Wax A | % DiaFil 610 | Appearance | % of urea released in 7 days | |
|---|---|---|---|---|
| | | | Not abraded | Abraded |
| 1.0 | 1.0 | free flowing, not dusty | 19.3 | 29.6 |
| 1.0 | 1.5 | very slightly dusty | 20.1 | 26.4 |
| 1.0 | 2.0 | dusty | 22.9 | 28.1 |
| 1.5 | 1.0 | free flowing | 17.4 | 23.2 |
| 1.5 | 1.5 | free flowing, not dusty | 19.7 | 23.7 |
| 1.5 | 2.0 | slightly dusty | 19.8 | 21.7 |
| 2.0 | 1.0 | clumpy | 17.2 | 22.1 |
| 2.0 | 1.5 | free flowing, not dusty | 18.2 | 20.6 |
| 2.0 | 2.0 | very slightly dusty | 19.8 | 20.9 |
| 2.0 | 3.0 | dusty | 23.5 | 25.9 |

The results in Table 1 indicate that 1% sealant provides excellent moisture barrier properties in the absence of abrasion, but that 1.5% is required to provide abrasion resistance. The results also indicate that the slow release properties deteriorate as more conditioner is applied.

EXAMPLE 2

The ethylene-vinyl acetate polymers and levels as % by weight indicated in Table 2 were dissolved in Wax A by the procedure described in Example 1. The wax-polymer mixtures were stirred at 120° C. until the polymers had completely dispersed in the wax. All of the compositions had congealing points of about 68–72° C. and needle penetration values of >20. The sealants were applied to the SCU described in Example 1 and conditioned with 2% diatomaceous earth (Celaton MN-35 from Eagle Picher Minerals, Inc., Reno, Nev.) by the procedures described in Example 1. Release rates before and after abrasion were determined by the above described procedures, and the results are shown in Table 2.

TABLE 2

| Polymer added to wax | % of urea released in 7 days | |
|---|---|---|
| | Not abraded | Abraded |
| None | 25.8 | 27.4 |
| 3% Elvax 265 (28% vinyl acetate, melt index 3) | 26.6 | 30.6 |

TABLE 2-continued

| Polymer added to wax | % of urea released in 7 days | |
|---|---|---|
| | Not abraded | Abraded |
| 3% Elvax 420 (18% vinyl acetate, melt index 150) | 28.6 | 32.7 |
| 3% Elvax 4355 (25% vinyl acetate, Acid Number 4–8, melt index 6) | 24.6 | 28.2 |
| 3% Elvax 4310 (25% vinyl acetate, Acid Number 4–8. melt index 500) | 23.3 | 23.7 |
| 5% Elvax 4310 | 18.8 | 22.7 |
| 7% Elvax 4310 | 19.2 | 19.2 |
| 10% Elvax 4310 | 20.1 | 22.5 |
| 15% Elvax 4310 | 21.0 | 22.2 |

Results from Table 2 show that the inclusion of acrylic acid monomer in the EVA polymers improves the slow release properties, and the abrasion resistance. The results also show that the sealant incorporating the higher melt index terpolymer has better abrasion resistance than the sealant with a lower melt index terpolymer.

EXAMPLE 3

5% by weight Elvax 4310 was dissolved in Wax A by the procedure in Example 1, and 2% by weight of this mixture was applied to SCU by the procedure in Example 1. The conditioners and amounts indicated in Table 3 were applied, the appearance was noted, and the release before and after abrasion was determined by the procedures in Example 1.

TABLE 3

| Conditioner and level | Appearance | % of urea released in 7 days | |
|---|---|---|---|
| | | Not abraded | Abraded |
| 1% Diatomaceous earth | tacky | 17.2 | 22.1 |
| 2% Diatomaceous earth | Free flowing, not dusty | 19.8 | 20.9 |
| 3% Diatomaceous earth | Dusty | 23.5 | 25.9 |
| 2% Attapulgite | Slightly dusty | 20.2 | 24.6 |
| 0.5% MicroCel E | Free flowing, not dusty | 19.3 | 24.4 |
| 1% MicroCel E | Very dusty | 22.5 | 28.9 |

TABLE 3-continued

| Conditioner and level | Appearance | % of urea released in 7 days | |
|---|---|---|---|
| | | Not abraded | Abraded |
| 2% Calcined kaolin | Slightly dusty | 17.5 | 21.8 |
| 0.5% Sipernat 50 | Slightly dusty | 22.1 | 28.9 |
| 1% Sipernat 50 | Very dusty | 22.1 | 33.4 |
| 2% Perlite | Free flowing, not dusty, hydrophobic | 11.3 | 13.4 |

The results in Table 3 show that lower levels of the materials with higher oil absorption (MicroCel E and Sipernat 50) are required to produce free flowing particles. The results also show that an excess of conditioner, besides providing a dusty product, also gives poorer results.

EXAMPLE 4

The adhesion promoters and levels indicated in Table 4 were added to Wax A by mixing the components in a molten state, the mixtures were applied at 2% to SCU and conditioned with 2% diatomaceous earth, and the release rates before and after abrasion were determined by the procedures in Example 1.

TABLE 4

| Additive and level | Not abraded | Abraded |
|---|---|---|
| None | 25.8 | 27.4 |
| 5% Elvax 4310 | 18.8 | 22.7 |
| 5% Sylvatac 100 NS | 21.6 | 25.2 |
| 5% Sylvatac 40 N | 22.4 | 25.2 |
| 5% AC 5120 | 22.0 | 26.4 |

EXAMPLE 5

The sealant compositions described in Table 5 were prepared and applied at 2% to SCU, by the procedures in Example 1. The compositions were conditioned with 2% diatomaceous earth or with 0.2% MicroCel E, as noted. The release rates before and after abrasion were determined by the procedures in Example 1, and are indicated in Table 5.

TABLE 5

| Wax base | Additive | Needle penetration | % of urea released in 7 days | |
|---|---|---|---|---|
| | | | Not abraded | Abraded |
| Conditioned with 2% Diatomaceous earth | | | | |
| Petrolatum, C.P. 82° C. | None | 87 | 19.4 | 21.0 |
| Petrolatum, CP. 82° C. | 5% Elvax 4310 | 53 | 15.5 | 19.8 |
| AC 1702 polyethylene M.P. 92° C. | None | 62 | 20.8 | 29.2 |
| AC 1702 polyethylene | 5% Elvax 4310 | 44 | 16.5 | 26.8 |
| 70:30 Heavy paraffinic oil: AC-6 Polyethylene, C.P. 78° C. | None | 71 | 22.2 | 24.2 |
| 70:30 Heavy paraffinic oil: AC-6 Polyethylene | 5% Elvax 4310 | 69 | 19.8 | 23.4 |
| 70:30 Heavy paraffinic oil: AC-6 Polyethylene | 5% Sylvatac 100 NS | 98 | 19.8 | 24.2 |
| Partially hydrogenated soybean oil, I.V. 65 | 10% Elvax 4310 | 30 | 20.8 | 31.3 |

TABLE 5-continued

| Wax base | Additive | Needle penetration | % of urea released in 7 days | |
|---|---|---|---|---|
| | | | Not abraded | Abraded |
| Conditioned with 0.2% MicroCel E: | | | | |
| Gulftene C30+, C.P. 74° C. | None | 5 | 23.4 | 41.0 |
| Gulftene C30+ | 20% Chlorinated paraffin (40% Chlorine) | 20 | 19.7 | 31.2 |
| Partially hydrogenated soybean oil, I.V. 52 | None | 26 | 43.7 | 57.2 |
| Partially hydrogenated soybean oil, I.V. 52 | 10% Elvax 4310 | 20 | 24.0 | 37.8 |
| Partially hydrogenated soybean oil, I.V. 52 | 10% Elvax 265 | <20 | 30.0 | 47.6 |
| Partially hydrogenated soybean oil, I.V. 26 | 10% Elvax 4310 | <20 | 25.6 | 46.7 |

EXAMPLE 6

The compositions described in Table 6 were prepared, and applied to SCU with a sulfur content of 13%, but a different lot from that used in the previous examples, by the procedure of Example 1. The sealed SCU was conditioned with 2% diatomaceous earth by the method in Example 1. The release rates before and after abrasion were determined by the procedures in Example 1, and are indicated in Table 6.

TABLE 6

| Wax | Additive | Needle Penetration | CP., ° C. | % of urea released in 7 days | |
|---|---|---|---|---|---|
| | | | | Not abraded | Abraded |
| Wax A | None | 110 | 70 | 28.6 | 36.0 |
| Wax A | 5% Elvax 4310 | 72 | 70 | 24.2 | 29.8 |
| 75:25 Wax A: Paraffin MP 160° F. | 5% Elvax 4310 | 64 | 68 | 16.3 | 23.8 |
| 50:50 Wax A: Paraffin MP 160° F. | None | 33 | 68 | 26.6 | 37.7 |
| 50:50 Wax A: Paraffin MP 160° F. | 5% Elvax 4310 | 26 | 68 | 15.9 | 30.2 |
| 50:50 Wax A: Paraffin MP 160° F. | 5% Sylvatac 100 NS | 39 | 68 | 20.6 | 28.6 |
| 50:50 Wax A: Paraffin MP 160° F. | 5% Chlorinated paraffin, 40% chlorine | 40 | 71 | 19.8 | 27.0 |
| 25:75 Wax A: Paraffin MP 160° F. | 5% Elvax 4310 | 22 | 68 | 15.5 | 28.2 |
| Paraffin MP 160° F. | 5% Elvax 4310 | 12 | 68 | 16.3 | 31.1 |

Comparative Example

A sample of SCU coated with 16.5% sulfur and 2% of a hard wax consisting of about 25% of an EVA copolymer in Gulftene 30+ (penetration value approx. 5) was subjected to the abrasion test described in Example 1, and the release rate was determined before and after abrasion by the procedure in Example 1. The results were:

| % of urea released before abrasion | 25.5 |
|---|---|
| % of urea released after abrasion | 47.3 |

Samples of the SCU granules before and after abrasion were examined with a microscope at 50× to determine the nature of the damage caused by the abrasion. It was observed that, even after abrasion, the wax remained well adhered to the sulfur, both on the intact particles and on the flakes or chips present, which consisted of sulfur and adhered wax. The abraded granules displayed areas where the substrate urea was visible, and also showed cracks in the sulfur coating. No damage to the coating materials was observed in the unabraded granules.

The invention can be embodied in other forms without departing from the spirit or essential attributes thereof. Particularly it will be appreciated by those skilled in the art that other wax materials and conditioners than those specifically disclosed which have the specified properties could have utility in the invention. Reference should therefore be had to the following claims, rather than to the foregoing specification to determine the scope of the invention.

The embodiments of the invention in which an exclusive property or privilege is claimed are defined as follows:

1. An abrasion resistant slow release fertilizer comprising a central core of water soluble nutrient surrounded by a layer of sulfur, sealed with a sealant composition comprised of
   (a) at least one wax material selected from the group consisting of petroleum waxes, synthetic waxes, natural waxes, vegetable and mineral waxes, fats and oil(s) and mixtures thereof, and
   (b) at least one wax soluble additive containing polar moieties selected from the group consisting of wax soluble polymers, chlorinated paraffins, rosin esters and tall oil pitch wherein the mixture of wax material and additive has a penetration value measured by ASTM D-1321 of 20 to 100 at 25° C., and a congealing point measured by ASTM D-938 of between about 50° C. and about 100° C.;

and at least one conditioner comprising a particulate material selected from the group consisting of diatomaceous earth, amorphous calcium silicate, synthetic precipitate silicas, clay minerals, and perlite with a surface area of at least about 2 m$^2$/g and an oil absorption of at least about 100%.

2. The fertilizer of claim 1 wherein the sealant composition comprises from about 1% to about 4% by weight of the total composition.

3. The fertilizer of claim 1 wherein the wax material comprises at least one petroleum wax.

4. The fertilizer of claim 1 wherein the wax material comprises a mixture of paraffinic oil and polyethylene.

5. The fertilizer of claim 1 wherein the wax material comprises Gulftene C30+.

6. The fertilizer of claim 1 wherein the additive is at least one wax soluble material wherein the polar moieties contained therein are chosen from the group consisting of esters, carboxylic acids and chlorine.

7. The fertilizer of claim 1 wherein the additive is chosen from the group consisting of wax soluble polymers with Acid Numbers from about 5 to about 120, and melt indexes of at least about 20.

8. The fertilizer of claim 1 wherein the additive is chosen from the group consisting of chlorinated paraffins with chlorine content of about 50% or less by weight.

9. The fertilizer of claim 1 wherein the additive is a wax soluble rosin ester with an Acid Number of at least about 5.

10. The fertilizer of claim 1 wherein the additive comprises from about 2% to about 25% by weight of the sealant composition.

11. The fertilizer of claim 1 wherein the conditioner comprises diatomaceous earth.

12. The fertilizer of claim 1 wherein the conditioner comprises an inorganic particulate material with a surface area of at least about 100 m$^2$/g and an oil absorption of at least about 200%.

13. A method of manufacturing an abrasion resistant slow release fertilizer comprising the steps of providing a sealant composition comprised of
(a) at least one wax material selected from the group consisting of petroleum waxes, synthetic waxes, natural waxes, vegetable and mineral waxes, fats and oil(s) and mixtures thereof, and
(b) at least one wax soluble additive containing polar moieties selected from the group consisting of wax soluble polymers, chlorinated paraffins, rosin esters and tall oil pitch wherein the mixture of wax material and adhesion promoter has a penetration value measured by ASTM D-1321 of 20 to 100 at 25° C., and a congealing point measured by ASTM D-938 of between about 50° C. and about 100° C.;

providing a quantity of sulfur coated fertilizer particles at a temperature at or above the congealing point of the sealant composition;

applying said sealant composition to the sulfur coated fertilizer particles and allowing the sealant to spread over the surfaces of the particles;

cooling the sealed particles so as to solidify the sealant without agglomerating the sealed fertilizer particles; and adding to the cooled particles with a particulate material selected from the group consisting of diatomaceous earth, amorphous calcium silicate, synthetic precipitate silicas, clay minerals, and perlite with a surface area of at least about 2 m$^2$/g and an oil absorption of at least about 100%, with mixing adequate to distribute the particulate material over the sealed particles.

14. A method of releasing water soluble nutrients to the soil comprising applying to the soil an abrasion resistant slow release fertilizer comprising a central core of water soluble nutrient surrounded by a layer of sulfur, sealed with a sealant composition comprised of (a) at least one wax material selected from the group consisting of petroleum waxes, synthetic waxes, natural waxes, vegetable and mineral waxes, fats and oil(s) and mixture thereof, and (b) at least one wax soluble additive containing polar moieties selected from the group consisting of wax soluble polymers, chlorinated paraffins, rosin esters and tall oil pitch wherein the mixture of wax material and additive has a penetration value measured by ASTM D-1321 of 20 to 100 at 25° C., and a congealing point measured by ASTM D-938 of between about 50° C. and about 100° C.;

and at least one conditioner comprising a particulate material selected from the group consisting of diatomaceous earth, amorphous calcium silicate, synthetic precipitate silicas, clay minerals and perlite with a surface area of at least about 2 m$^2$/g and an oil absorption of at least about 100%.

* * * * *